United States Patent
Son et al.

(10) Patent No.: US 9,595,711 B2
(45) Date of Patent: Mar. 14, 2017

(54) POSITIVE ELECTRODE ACTIVE MATERIAL, PREPARATION METHOD THEREOF, AND LITHIUM BATTERY INCLUDING THE SAME

(71) Applicant: Samsung Electronics Co., Ltd., Suwon-si, Gyeonggi-do (KR)

(72) Inventors: In-hyuk Son, Yongin-si (KR); Min-sang Song, Seongnam-si (KR); In-yong Song, Suwon-si (KR); Jae-man Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 208 days.

(21) Appl. No.: 14/321,195

(22) Filed: Jul. 1, 2014

(65) Prior Publication Data

US 2015/0111106 A1 Apr. 23, 2015

(30) Foreign Application Priority Data

Oct. 18, 2013 (KR) ........................ 10-2013-0124931

(51) Int. Cl.
*H01M 4/505* (2010.01)
*H01M 4/1391* (2010.01)
(Continued)

(52) U.S. Cl.
CPC ......... *H01M 4/366* (2013.01); *H01M 4/0428* (2013.01); *H01M 4/0471* (2013.01);
(Continued)

(58) Field of Classification Search
None
See application file for complete search history.

(56) References Cited

U.S. PATENT DOCUMENTS 7,314,683 B2 1/2008 Choi et al.
7,632,317 B2 * 12/2009 Belharouak ........... H01M 4/136
29/623.1
(Continued)

FOREIGN PATENT DOCUMENTS

JP 2001028265 A * 1/2001
JP 2007123255 A 5/2007
(Continued)

OTHER PUBLICATIONS

Marcinek et al., Microwave plasma chemical vapor deposition of carbon coatings on LiNi1/3Co1/3Mn1/3O2 for Li-ion battery composite cathodes, Nov. 2008, J Electrochem Soc, 156, A48-A51.*
(Continued)

*Primary Examiner* — Daniel Gatewood
(74) *Attorney, Agent, or Firm* — Cantor Colburn LLP

(57) ABSTRACT

A positive electrode active material including: a lithium complex oxide represented by Formula 1; and a carbon coating layer disposed on the lithium complex oxide, wherein, in a C1s XPS spectrum of the positive electrode active material, a peak intensity of a first peak at a binding energy from about 288 eV to about 293 eV is greater than a peak intensity of a second peak at a binding energy from about 283 eV to about 287 eV, and in an O1s X-ray photoelectron spectrum of the positive electrode active material, a peak intensity of a third peak at a binding energy from about 530.5 eV to about 535 eV is greater than a peak intensity of a fourth peak at a binding energy from about 527.5 electron volts to about 530 electron volts, $Li_a M_b M'_c M''_d O_e$. Formula 1

17 Claims, 10 Drawing Sheets

(51) Int. Cl.
*H01M 4/525* (2010.01)
*H01M 4/36* (2006.01)
*H01M 4/04* (2006.01)
*H01M 4/62* (2006.01)
*H01M 10/052* (2010.01)

(52) U.S. Cl.
CPC ......... *H01M 4/1391* (2013.01); *H01M 4/505* (2013.01); *H01M 4/525* (2013.01); *H01M 4/625* (2013.01); *H01M 4/626* (2013.01); *H01M 10/052* (2013.01); *Y02E 60/122* (2013.01); *Y02T 10/7011* (2013.01)

(56) References Cited

U.S. PATENT DOCUMENTS

| | | | |
|---|---|---|---|
| 7,939,218 | B2 | 5/2011 | Niu |
| 9,325,028 | B2 | 4/2016 | Kwon et al. |
| 9,371,235 | B2 | 6/2016 | Son et al. |
| 9,444,085 | B2 | 9/2016 | Kwon et al. |
| 2008/0187838 | A1 | 8/2008 | Le |
| 2010/0075229 | A1* | 3/2010 | Atsuki ................. H01M 4/131 429/231.8 |
| 2011/0183169 | A1 | 7/2011 | Bhardwaj et al. |
| 2012/0034522 | A1* | 2/2012 | Sheem ................... H01M 4/13 429/213 |
| 2013/0040201 | A1 | 2/2013 | Manthiram et al. |
| 2013/0083496 | A1 | 4/2013 | Franklin et al. |
| 2013/0108907 | A1 | 5/2013 | Bhardwaj et al. |
| 2014/0131630 | A1 | 5/2014 | Hwang et al. |
| 2014/0255781 | A1 | 9/2014 | Son et al. |
| 2016/0141607 | A1 | 5/2016 | Park et al. |

FOREIGN PATENT DOCUMENTS

| | | |
|---|---|---|
| JP | 2011014368 A | 1/2011 |
| KR | 1020020010843 A | 2/2002 |
| KR | 1020040071852 A | 8/2004 |
| KR | 1020090108955 A | 10/2009 |
| KR | 1020120117526 A | 10/2012 |
| KR | 1020130087152 A | 8/2013 |
| KR | 1020140035689 A | 3/2014 |
| KR | 1020140077622 A | 6/2014 |
| KR | 1020140110703 A | 9/2014 |
| KR | 1020140111548 A | 9/2014 |
| KR | 1020150062123 A | 6/2015 |

OTHER PUBLICATIONS

Doan et al., "Preparation of carbon coated LiMnPO4 powders by a combination of spray pyrolysis with dry ball-milling followed by heat treatment", Advanced Powder Technology, vol. 21, Issue. 2, 2009, pp. 187-196.

Moskon et al., "Morphology and electrical properties of conductive carbon coatings for cathode materilas", Journal of Power Sources, vol. 174, Issue 2, 2007, pp. 683-688.

Han et al., "Investigation on the First-Cycle Charge Loss of Graphite Anodes by Coating of the Pyrolytic Carbon Using Tumbling CVD", Journal of the Electrochemical Society, vol. 151, Issue 2, 2004, pp. A291-A295.

Marcinek et al., "Microwave Plasma Chemical Vapor Deposition of carbon coatings on LiNi1/3Co1/3O2 for Li-Ion Battery Composite Cathodes", Journal of the Electrochemical Society, vol. 156, Issue 1, 2009, pp. A48-51.

* cited by examiner

POSITIVE ELECTRODE ACTIVE MATERIAL, PREPARATION METHOD THEREOF, AND LITHIUM BATTERY INCLUDING THE SAME

RELATED APPLICATIONS

This application claims priority to and the benefit of Korean Patent Application No. 10-2013-0124931, filed on Oct. 18, 2013, in the Korean Intellectual Property Office, and all the benefits accruing therefrom under 35 U.S.C. §119, the content of which is incorporated herein in its entirety by reference.

BACKGROUND

1. Field

The present disclosure relates to a positive electrode active material, a preparation method thereof, and a lithium battery employing a positive electrode including the same.

2. Description of the Related Art

As demands for high energy density increase, use of a high-voltage positive electrode active material have also increased. In a high-voltage environment, avoiding oxidation of an electrolyte on a surface of a lithium complex oxide positive electrode active material is difficult, and thus a method to suppress oxidation of the electrolyte is desired. In general, a high-voltage positive electrode active material may have a low conductivity because it contains a relatively large amount of lithium, and thereby performance of a lithium battery may be deteriorated. Also, unlike a mobile device, a battery for an electric vehicle or for electric power storage operates in a high-temperature environment, and a temperature of the battery may increase easily since the battery may be rapidly charged/discharged. Thus, there remains a need for a lithium battery that can operate at a high temperature and has a high energy storage efficiency.

SUMMARY

Provided is a positive electrode active material, a preparation method thereof, and a lithium battery employing a positive electrode including the same.

Additional aspects will be set forth in part in the description which follows and, in part, will be apparent from the description.

According to an aspect, a positive electrode active material includes: a lithium complex oxide represented by Formula 1; and a carbon coating layer disposed on the lithium complex oxide, wherein, in a C1s X-ray photoelectron spectroscopy (XPS) spectrum of the positive electrode active material, a peak intensity of a first peak at a binding energy from about 288 electron volts (eV) to about 293 eV is greater than a peak intensity of a second peak at a binding energy from about 283 eV to about 287 eV, and in an O1s XPS spectrum of the positive electrode active material, a peak intensity of a third peak at a binding energy from about 530.5 eV to about 535 eV is greater than a peak intensity of a fourth peak at binding energy from about 527.5 eV to about 530 eV, $$Li_aM_bM'_cM''_dO_e \qquad \text{Formula 1}$$

wherein, in Formula 1, $0 \leq a \leq 1.0$, $0 \leq b \leq 2$, $0 \leq c \leq 2$, and $0 \leq d \leq 2$;
b, c, and d are identical or different and are not simultaneously 0, and e is a value that makes the lithium complex oxide electrically neutral and is in range of 1 to 4;

M and M' are different from each other and are each independently selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba;
M" is an element different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, Ba, Si, B, F, S, and P; and
at least one of M and M' is selected from Ni, Co, Mn, Mo, Cu, and Fe.

According to another aspect, a lithium battery includes a positive electrode including the positive electrode active material.

According to another aspect, a method of preparing a positive electrode active material includes: heat-treating a lithium complex oxide represented by Formula 1 in an atmosphere including a compound represented by Formula 2 to obtain the positive electrode active material, $$Li_aM_bM'_cM''_dO_e \qquad \text{Formula 1}$$

wherein, in Formula 1,
$0 \leq a \leq 1.0$, $0 \leq b \leq 2$, $0 \leq c \leq 2$, and $0 \leq d \leq 2$;
b, c, and d are identical or different and are not simultaneously 0,
e is a value that makes the lithium complex oxide electrically neutral and is in a range of 1 to 4;
M and M' are different and are each independently selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba;
M" is an element different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, Ba, Si, B, F, S, and P; and
at least one of M and M' is at least one selected from Ni, Co, Mn, Mo, Cu, and Fe;

$$C_nH_{(2n)} \qquad \text{Formula 2}$$

wherein, in Formula 2, n is in a range of 1 to 6.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
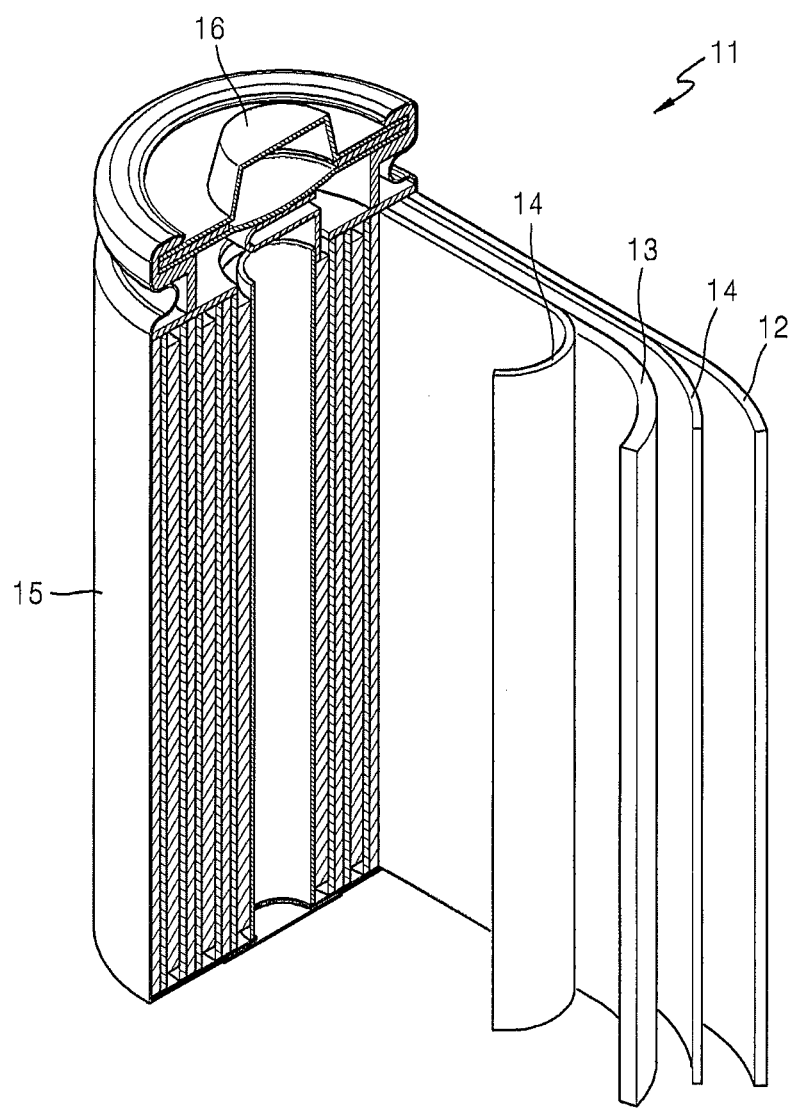
FIG. 1 is a schematic view of an embodiment of a lithium battery.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to one or more embodiments, a positive electrode active material, a preparation method thereof, and a lithium secondary battery employing a positive electrode including the same will be described in further detail with reference to the accompanying drawings.

A positive electrode active material includes a lithium complex oxide represented by Formula 1; and a carbon coating layer disposed on the lithium complex oxide. In a C1s X-ray photoelectron spectroscopy (XPS) spectrum of the positive electrode active material, a peak intensity of a first peak at a binding energy in a range of about 288 electron volts (eV) to about 293 eV is greater than a peak intensity of a second peak at a binding energy in a range of about 283 eV to about 287 eV, and, in a O1s XPS spectrum, a peak intensity of a third peak at a binding energy in a range of about 530.5 eV to about 535 eV is greater than a peak intensity of a fourth peak at a binding energy in a range of about 527.5 eV to 530 eV. The C1s XPS spectrum and O1s XPS spectrum are obtained via the XPS analysis.

$$Li_aM_bM'_cM''_dO_e \quad \text{Formula 1}$$

In Formula 1, $0 \leq a \leq 1.0$, $0 \leq b \leq 2$, $0 \leq c \leq 2$, and $0 \leq d \leq 2$, wherein b, c, and d are identical or different and are not simultaneously 0, and e is a value that makes the lithium complex oxide electrically neutral, wherein e is in a range of 1 to 4;

M and M' are different from each other and are each independently selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba;

M" is an element different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, Ba, Si, B, F, S, and P; and at least one of M and M' is selected from Ni, Co, Mn, Mo, Cu, and Fe.

In Formula 1, a may be, for example, in a range of about 0.4 to about 1.0, in particular, about 0.8 to about 1.0. In an embodiment, $0 < a \leq 1.0$, $0 < b \leq 2$, $0 < c \leq 2$, and/or $0 < d \leq 2$. In another embodiment, $0 < a < 1.0$, $0 < b < 2$, $0 < c < 2$, and/or $0 < d < 2$. For example, $0.2 \leq a \leq 0.8$, $0.2 \leq b \leq 1.8$, $0.2 \leq c \leq 1.8$, and/or $0.2 \leq d \leq 1.8$.

The lithium complex oxide may be, for example, a compound represented by Formula 3.

$$Li_a Ni_b Co_{1-b-c} Mn_c M''_d O_2 \quad \text{Formula 3}$$

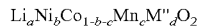

In Formula 3, M" is an element selected from Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba;
wherein $0.4 \leq a \leq 1.0$, $0 \leq b \leq 1$, $0 \leq c \leq 1$, $0 \leq d \leq 1$, and $b+c+d=1$. In an embodiment, $0.4 < a \leq 1.0$, $0 < b \leq 1$, $0 < c \leq 1$, and/or $0 < d \leq 1$; or $0.4 < a < 1.0$, $0 < b < 1$, $0 < c < 1$, and/or $0 < d < 1$.

The lithium complex oxide may be a compound represented by Formula 4.

$$Li_a Ni_b Co_{1-b-c} Mn_c O_2 \quad \text{Formula 4}$$

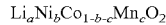

In Formula 4, $0.4 \leq a \leq 1.0$, $0 \leq b \leq 1$, and $0 \leq c \leq 1$. In an embodiment, $0.4 < a \leq 1.0$, $0 < b \leq 1$, and/or $0 < c \leq 1$; or $0.4 < a < 1.0$, $0 < b < 1$, and/or $0 < c < 1$.

In an embodiment, the lithium complex oxide may include a lithium complex oxide having a high content of nickel and may provide high capacity characteristics. For example, in Formula 4, a may be in a range of about 0.8 to about 1.0, in particular, about 0.9 to about 1.0; b may be in a range of about 0.5 to about 0.9; and c may be in a range of about 0.1 to about 0.5.

The lithium complex oxide may be at least one selected from $LiCoO_2$, $LiCo_{0.1}Ni_{0.6}Mn_{0.3}O_2$, and $LiCo_{0.33}Ni_{0.33}Mn_{0.33}O_2$.

When the nickel-rich lithium complex oxide is used, and while not wanting to be bound by theory, it is understood that a lithium secondary battery having an increased capacity may be prepared, however the nickel-rich lithium complex oxide compound may be structurally unstable, and the nickel-rich lithium complex oxide compound may decompose when heated, e.g., when heated due to a short circuit of the battery. As a result, oxygen may be released from the nickel-rich lithium complex oxide and thus safety issue may occur. In an embodiment, when the carbon coating layer is disposed on the nickel-rich lithium complex oxide, a structural stability of the nickel-rich lithium complex oxide may be improved.

While not wanting to be bound by theory, it is understood that the peak at a binding energy in a range of about 288 eV to about 293 eV is related a carboxyl group of the formula —COOH, or a carboxylate group of the formula —C(=O)O, and the peak at a binding energy in a range of about 283 eV to about 287 eV is related to a —C=C— or a —C—C group.

A ratio of peak intensity of a first peak at a binding energy in a range of about 288 eV to about 293 eV to peak intensity of a second peak at a binding energy in a range of about 283 eV to about 287 eV in the C1s XPS spectrum, or a ratio of a peak intensity of a third peak at binding energy in a range of about 530.5 eV to about 535 eV to a peak intensity of a fourth peak at a binding energy in a range of about 527.5 eV to about 530 eV in the O1s XPS spectrum may be in a range of 1:1 to 3:1, for example 1.2:1 to 2.8:1; or 1.5:1 to 2.5:1, for example, 2:1. If the positive electrode active material has the foregoing ratio of peak intensities within this range, and while not wanting to be bound by theory, it is understood that the positive electrode active material may have a carbon coating layer on a surface of the positive electrode active material. Also, it is understood that the peak at binding energy in a range of about 530.5 eV to about 535 eV is from a —COOH or a —C=O group.

In the C1s XPS spectrum, an integrated intensity ratio of the first peak at a binding energy from about 288 eV to about 293 eV to the second peak at a binding energy from about 283 eV to about 287 eV is in a range of 1:1 to 3:1, for example 1.2:1 to 2.8:1; or 1.5:1 to 2.5:1, for example, 2:1. Also, in the O1s XPS spectrum, an integrated intensity ratio of a third peak at a binding energy from about 530.5 eV to about 535 eV to a fourth peak at a binding energy from about 527.5 eV to about 530 eV is in a range of 1:1 to 3:1, for example 1.2:1 to 2.8:1; or 1.5:1 to 2.5:1, for example, 2:1. The positive electrode active material having such characteristics has improved conductivity and durability.

In regard of the positive electrode active material, an $O_{1S}/C_{1S}$ atomic ratio obtained from an X-ray photoelectron spectroscopy may be in a range of about 2.5:1 to about 3.2:1, for example 2.6:1 to 3.1:1, for example, 2.9:1. Also, an atomic content of Mn, e.g., based on an intensity of a Mn(2p) peak, decreases compared to the case when a lithium complex oxide not having the carbon coating layer is used, and thus it is understood that the carbon coating layer contains a metal-carbonyl compound, such as a compound of the formula Mn(CO)x or $MnCO_2$, in addition to amorphous carbon.

In an embodiment, the lithium complex oxide is a lithium nickel cobalt manganese complex oxide. The amount of carbon and oxygen may be determined from the area ratio of a carbon-1s ($C_{1S}$) peak and an oxygen-1s ($O_{1S}$) peak obtained by XPS analysis of the positive electrode active material containing the lithium complex oxide, where the sum of these areas is 100% in a wide XPS scan. The amount of carbon and oxygen, based on the carbon-1s ($C_{1S}$) and the oxygen-1s ($O_{1S}$) peaks, may be, each respectively, from about 20 to 25 atomic percent (atom %) and from about 60 to about 70 atom %, or about 21 to 24 atom % and about 62 to about 68 atom, based on a total content of the positive electrode active material, and the rest of the lithium complex oxide may include the amount (e.g., in atomic percent) of Mn, Co, and Ni determined by the area ratio of the Mn(2p) peak, the Co(2p) peak, and the Ni(2p) peak, if present.

When derivative thermogravimetry (DTG) is performed on the positive electrode active material according to an embodiment, a first peak appears at a temperature from about 120° C. to about 220° C. Also, a second peak appears at a temperature from about 230° C. to about 410° C. An intensity ratio of the second peak to the first peak may be in a range of 1:9 to 9:1, for example 1:8 to 8:1, or 1:7 to 7:1, for example, 4:6.

While not wanting to be bound by theory, it is understood that the first peak is related to the amorphous carbon, and the second peak is related to a product obtained from a side reaction of the positive electrode active material and the electrolyte.

A content of carbon in the carbon coating layer of the positive electrode active material may be from about 0.001 part to about 15 parts by weight, for example, from about 0.01 part to about 15 parts by weight, based on 100 parts by weight of the lithium complex oxide represented by Formula 1. When a content of carbon is in this range above, the positive electrode active material may have excellent conductivity and durability.

A content of carbon may be confirmed by thermogravimetry analysis and/or a photoelectron spectroscopy.

The positive electrode active material may have a structure in which carbon is disposed on an inner surface and/or on an outer surface of a particle of the lithium complex oxide. The structure of the positive electrode active material may be confirmed by scanning electron microscope (SEM) analysis.

The carbon coating layer may be a continuous or discontinuous layer. In an embodiment, the carbon coating layer is disposed on an entire surface of the lithium complex oxide. In another embodiment, the carbon coating layer is disposed on about 50% to about 99.99%, for example about 55% to about 99.9%, or about 60% to about 99%, or about 65% to about 95% of the surface of the lithium complex oxide. The carbon coating layer may be formed by a gaseous reaction of the compound represented by Formula 2, such as methane. While not wanting to be bound by theory, it is understood that the carbon coating layer formed by the gaseous reaction controls an ability of the surface of the lithium complex oxide to transport lithium ions, and thus lithium migration paths may be provided. Alternatively, a carbon coating layer formed by another manufacturing method may block migration of lithium ions to the lithium complex oxide due to the characteristics of the carbon coating layer.

Also, the carbon coating layer may be disposed on an inner surface of the lithium complex oxide as well as on the outer surface of the lithium complex oxide by performing the gaseous reaction described above. The structure may be confirmed by SEM analysis.

In an embodiment, the carbon coating layer contains amorphous carbon and a carbonyl-containing component. Here, the carbonyl-containing component may be a residue of, for example, a carbonyl group or a carboxylic acid, but may include a metal carbonate component, such as $Mn(CO)_3$, $Mn_2(CO)_{10}$, or $2Li(Mn(CO)_5)$.

The carbon coating layer may further include a graphitic material in addition to the amorphous carbon.

A thickness of the carbon coating layer may be from about 0.01 nanometer (nm) to about 100 nm, for example, from about 0.5 nm to about 15 nm.

A metal compound layer including a metal compound may be further disposed on an upper surface of the carbon coating layer of the positive electrode active material, e.g., opposite the lithium complex oxide, or between the lithium complex oxide represented by Formula 1 and the carbon coating layer. In this regard, when the metal compound is further included, formation of a solid-electrolyte-interface (SEI) layer may be prevented because side reactions are suppressed.

Examples of the metal compound may include a metal oxide, such as at least one metal compound selected from a magnesium oxide, a manganese oxide, an aluminum oxide, a titanium oxide, a zirconium oxide, a tantalum oxide, a tin oxide, a hafnium oxide, and a metal fluoride, such as an aluminum fluoride (e.g., $AlF_3$).

In an embodiment, the metal compound layer including the metal compound may form an aluminum oxide layer on an upper surface of the lithium complex oxide represented by Formula 1, or on the lithium complex oxide represented by Formula 1 having the carbon coating layer provided by heat-treating a metal, such as aluminum (Al), in an oxygen atmosphere or in air.

As is further described above, when the aluminum oxide coating layer is formed on a surface of the lithium complex oxide represented by Formula 1, a desired positive electrode active material may be obtained by forming the carbon coating layer on a surface of the resultant obtained by a method of manufacturing the positive electrode active material according to an embodiment, for example, heating in $CH_4$ in a gaseous process.

When an aluminum oxide coating layer is formed on a surface of the lithium complex oxide represented by Formula 1 having the carbon coating layer, the aluminum oxide coating layer may be formed on a surface of the carbon coating layer by the method described above.

In another embodiment, when the coating layer comprises aluminum fluoride, a desired positive electrode active material may be obtained by mixing and mechanically milling under an inert gas atmosphere.

As described above, when the aluminum fluoride coating layer is formed on a surface of the lithium complex oxide represented by Formula 1, the carbon coating layer may be formed on a surface of the resultant by the method of preparing the positive electrode active material according to an embodiment, for example through a $CH_4$ gaseous reaction, to obtain a desired positive electrode active material.

An adherence between the lithium complex oxide and the carbon coating layer may be evaluated by measuring a distance therebetween with an SEM. The distance between the carbon coating layer and the lithium complex oxide may be about 1 nm or less, for example from about 0.5 nm to about 1 nm.

The positive electrode active material may have a specific surface area from about 5 square meters per gram ($m^2/g$) to about 10 $m^2/g$, and an average pore diameter from about 5 nm to about 10 nm. Also, a pore volume of the positive electrode active material may be from about 150 cubic centimeters per gram ($cm^3/g$) to about 250 $cm^3/g$. When a specific surface area, average pore diameter, and pore volume are within these ranges, the positive electrode active material may have excellent conductivity, durability, and rate capability.

Hereinafter, a method of preparing a positive electrode active material according to another embodiment will be further described.

In an atmosphere of a compound represented by Formula 2, a lithium complex oxide represented by Formula 1 may be heat-treated under an atmosphere including the compound represented by Formula 2 to obtain a positive electrode active material including the lithium complex oxide represented by Formula 1 and a carbon coating layer formed on the lithium complex oxide.

$$Li_aM_bM'_cM''_dO_e \qquad \text{Formula 1}$$

In Formula 1, $0 \leq a \leq 1.0$, $0 \leq b \leq 2$, $0 \leq c \leq 2$, and $0 \leq d \leq 2$;

b, c, and d are identical or different, and not simultaneously 0, and e is a value that makes the lithium complex oxide electrically neutral and is in a range of 1 to 4;

M and M' are different from each other and may be, each independently, at least one element selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba; and M" is an element different from M and M' and may be selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, Ba, Si, B, F, S, and P, wherein at least one of M and M' comprises at least one element selected from Ni, Co, Mn, Mo, Cu, and Fe.

$$C_nH_{(2n)} \qquad \text{Formula 2}$$

In Formula 2, n is in a range from 1 to 6, for example 1 to 4, or 1 to 2.

The compound represented by Formula 2 may be at least one selected from methane ($CH_4$), and butane.

The atmosphere may further include an inert gas comprising at least one selected from nitrogen, helium, and argon, in addition to the compound represented by Formula 2.

When the lithium complex oxide represented by Formula 1 is heat-treated in the atmosphere of the compound represented by Formula 2, or a gas mixture of the compound represented by Formula 2 and the inert gas, a carbon coating layer is formed on the lithium complex oxide. Although not to be bound by a specific theory, the coating process is related to reforming of a compound represented by Formula 2 included in the gas mixture using $CO_2$. For example, when the compound represented by Formula 2 is methane (that is, in Formula 2, n is 1) carbon deposition caused by a reaction of Reaction Scheme 1 may be used.

$$CH_4 \longleftrightarrow 2H_2 + C \qquad \text{Reaction Scheme 1}$$

Among methods of forming the carbon coating layer, the reaction that may occur during the heat-treatment may include the reaction described above. Other reactions may also be used.

Various methods have been tried to improve the properties (e.g., battery performance) of a lithium transition metal complex oxide by providing, for example, a carbon coating on a positive electrode active material for a lithium battery. However, most alternative methods provide a carbon coating layer on a surface of a lithium complex oxide by mixing an organic material (i.e., a carbonaceous organic precursor) that may provide the carbon layer by thermal decomposition with the lithium complex oxide (e.g., a positive electrode active material) or its precursor and heat-treating the mixture. According to the alternative methods, when the carbonaceous organic precursor is mixed and heat-treated with an oxide-based positive electrode active material, oxygen may be dissociated from the positive electrode active material, and thus a capacity may decrease. Also, a suitably homogenous coating of a carbon material on the positive electrode active material may be difficult to form, and, for example, when pores are formed in the active material, coating of the carbonaceous material on an inner surface of the pores may be difficult. Also, in order to coat crystalline carbon having high conductivity, heat-treatment at a relatively higher temperature is often used, and thus a structure of the active material may be deformed due to the high temperature which may lead to loss of battery characteristics.

In order to use a lithium battery in an electric power storage or electric vehicle application, a capacity of a positive electrode active material is desirably increased. In this regard, a positive electrode active material containing an increased amount of lithium, such as an over-lithiated oxide (OLO) is suggested, but the conductivity of the OLO is low, and thus life characteristics and rate characteristics are deteriorated. When a carbon coating layer is introduced to the OLO-based lithium positive electrode active material, conductivity may increase, but the OLO, to which a carbon coating is provided by the alternative coating method, has a deformed crystal structure, and thus the OLO may not be fully suitable as a positive electrode active material.

According to an embodiment, a method of forming a carbon coating layer provides a very homogeneous chemically-disposed carbon coating on a lithium complex oxide to provide a positive electrode active material at a relatively low temperature through a reaction between compounds represented by Formulas 1 and 2, and thus problems caused by alternative methods of forming the carbon coating on a positive electrode active material may be resolved. For example, when a pore is included in an active material, i.e., the lithium complex oxide, a homogeneous carbon coating may be provided on an inner surface of the pore. A gas mixture including a compound represented by Formula 2 and carbon dioxide may cause carbon deposition through various reactions (e.g., Reaction Scheme 1) at a heat-treatment temperature. When a carbon coating is formed by the carbon deposition, oxygen dissociation does not substantially occur at the positive electrode active material. That is, in an embodiment, an oxygen content of the lithium complex oxide represented by Formula 1 after the heating is about 95% to about 100%, or about 96% to about 99.99%, or about 97% to about 99%, of an oxygen content of the lithium complex oxide represented by Formula 1 before the heating. In addition, the carbon coating is formed by a gaseous reaction, and thus a relatively more homogeneous carbon coating may be provided compared to when an alternative method that uses thermal decomposition after mixing with an organic precursor is used. Due to the high permeability of a gas, homogeneous carbon coating on an inner portion of the positive electrode active material, which may be an inner surface of the pore in the positive electrode active material, may be provided. Also, a carbon coating having a high crystallinity at a relatively low temperature may be provided, and thus conductivity of the positive electrode active material may be increased without a change in a structure of the positive electrode active material.

According to an embodiment, the positive electrode active material has a carbon coating layer formed on a surface of a lithium complex oxide by a gaseous reaction, e.g., using $CH_4$, and thus lifespan and rate characteristics of a lithium battery may be improved. When the improved lifespan is applied to an electric vehicle, the lithium battery may be used for a longer period of time, and when the rate characteristics are improved, the lithium battery performs better, e.g., for acceleration of the vehicle. In this regard, a carbon coating layer is formed on a surface of a positive electrode, and thus a side reaction between an electrolyte and the positive electrode active material may be suppressed. Also, as the carbon coating layer suppresses dissolution of the positive electrode active material, conductivity of the positive electrode active material increases, and thus the positive electrode active material with improved lifespan, as well as increased rate capacity, may be obtained. When the positive electrode active material is used, a resistance in the battery may be decreased.

The positive electrode active material may be a positive electrode active material for a lithium battery.

A heat-treatment temperature during preparation of the positive electrode active material is not particularly limited as long as carbon coating may be performed without causing substantial deformation of a structure (e.g., a structure that may be confirmed by an XRD) of the lithium complex oxide at the temperature. Here, the term "substantial deformation" denotes that a structure of the corresponding lithium complex oxide (e.g., a positive electrode active material) deforms and thus loses its desirable physical properties (e.g., electrical properties of a level enabling application as a battery). The heat-treating temperature may be about 1000° C. or lower, for example, about 750° C. or lower, about 700° C. or lower, about 600° C. or lower, or from about 400° C. to about 1000° C., for example about 450° C. to about 950° C., or about 500° C. to about 900° C.

A heat-treatment pressure may be selected in consideration of a heat-treatment temperature, a composition of a gas mixture, and a desired amount of carbon coating. The heat-treatment pressure may be selected by selecting amounts of a compound represented by Formula 1 and a compound represented by Formula 2 that are used to provide the positive electrode active material. For example, a heat-treatment pressure may be about 1 atmosphere (atm) or higher, for example, about 2 atm or higher, about 3 atm or higher, about 4 atm or higher, or about 5 atm or higher, or about 1 atm to about 10 atm, but is not limited thereto.

A heat-treatment time is not particularly limited and may be appropriately selected according to a heat-treatment temperature, a heat-treatment pressure, a composition of a gas mixture, and/or a desired amount of carbon coating. For example, a heat-treatment time may be from about 10 minutes to about 100 hours, for example, from about 30 minutes to about 90 hours, or from about 50 minutes to about 40 hours, but is not limited thereto. Although not to be restricted by a particular theory, an amount of deposited carbon increases as time passes, and, accordingly, electrical properties of the lithium complex oxide may be improved.

A carbon coating layer is formed on the lithium complex oxide represented by Formula 1 through the heat-treatment. An amount of the carbon coating is not particularly limited and may be appropriately selected according to a desired physical property (e.g., a property related to battery characteristics) of the lithium complex oxide. An amount of the carbon coating may be appropriately selected by selecting a temperature, a pressure, a time, and/or a composition of the gas for the heat-treatment.

When a carbon coating layer is formed on the lithium complex oxide according to an embodiment, a structure of the lithium complex oxide is not deformed, and the carbon coating layer has stable crystalline structure up to, for example, 4.5 volts versus lithium (V), and thus no significant deterioration in electrical properties, such as, battery performance, occur and a high conductivity may be easily provided, unlike when the carbon coating layer is formed by a coating method including thermal decomposition of a solid carbonaceous precursor organic material, such as, sucrose.

The carbon coating layer may be substantially homogeneously formed on a surface of the lithium complex oxide.

When the lithium complex oxide includes a pore, the surface on which the carbon coating layer is disposed may include an inner portion of the lithium complex oxide, including an inner surface of the pore, in addition to an outer surface of the lithium complex oxide. The carbon coating layer formed on the surface of the lithium complex oxide may have a homogenous distribution of carbon atoms that may be confirmed by a carbon-mapping analysis by energy dispersive X-ray spectroscopy (EDS). The carbon coating layer of the carbon-coated lithium complex oxide (e.g., the positive electrode active material) that may be obtained by an alternative coating method is not homogeneous throughout the entire surface of the lithium complex oxide, and thus does not have homogeneous carbon distribution when analyzed by an EDS carbon-mapping analysis. Whereas, when the carbon coating method according to an embodiment is used, carbon is coated on the lithium complex oxide (e.g., positive electrode active material) though a gaseous reaction and thus may have homogeneous carbon distribution when analyzed by EDS carbon-mapping analysis.

The carbon coating on the lithium complex oxide according to an embodiment may include a carbon material including a carbon-carbon covalent bond (e.g., C—C or C═C). The carbon coating may further include a —COOH residue or an —OH residue. Examples of the carbon material may include a carbide compound, for example in the form of a film or a filament of an amorphous carbon polymer, and a graphite material, e.g., as a film or a filament.

The positive electrode active material has a small amount of the carbon coating due to formation of a carbon layer and has excellent conductivity. Also, productivity of the method of forming a carbon coating layer using a $CH_4$ gaseous reaction is excellent due to its simple process and low cost. Thus, when the method is used, a positive electrode material, such as a high voltage positive electrode active material, that would have not been suitable as a positive electrode active material due to its poor conductivity, may be made suitable for use as a positive electrode active material.

As is further disclosed above, a positive electrode active material includes a carbon coating homogeneously formed on a lithium transition metal complex oxide, and thus decomposition of an electrolyte generated on a surface of a positive electrode at a high voltage may be effectively prevented. Also, elution of a metal of the active material, which may be dissolved into the electrolyte or re-deposited on a surface of the positive electrode, may be prevented. In addition, when stored at a high temperature, self-charging generated by a side-reaction on a surface of the positive electrode active material may be prevented, and a decrease in a battery capacity caused by charging/discharging at a high temperature may be reduced.

According to another aspect, a lithium battery having a positive electrode including the positive electrode active material is provided.

The lithium battery includes a positive electrode, a negative electrode, a separator disposed therebetween, and a lithium salt-containing non-aqueous electrolyte.

The positive electrode may be prepared by coating a positive electrode active material composition including the positive electrode active material according to an embodiment and a binder on a current collector.

Also, the positive electrode active material composition may be formed as a film on the separator without the current collector.

In particular, the positive electrode active material, a conducting agent, a binder, and a solvent are combined to prepare a positive electrode active material composition may be prepared. The positive electrode active material composition may be directly coated on the metallic current collector to prepare a positive electrode. Alternatively, the positive electrode may be prepared by casting the positive electrode active material composition on a separate support, and then laminating a film separated from the support on the metallic current collector.

Examples of the conducting agent may include at least one selected from acetylene black, Ketjen black, natural graphite, artificial graphite, carbon black, carbon fibers, a metal powder, metal fiber and/or a metal tube of copper, nickel, aluminum, and/or silver, and a conductive material, such as a polyphenylene derivative. A combination comprising at least one of the foregoing can be used. The conducting agent is not limited thereto, and any suitable material available as a conducting agent in the art may be used.

Examples of the binder may include at least one selected from a vinylidene fluoride/hexafluoropropylene copolymer, polyvinylidene fluoride (PVDF), polyacrylonitrile, polymethylmethacrylate, polytetrafluoroethylene, a styrene butadiene rubber-based polymer, polyacrylic acid, polyamideimide, and polyimide. The binder is not limited thereto, and any suitable material available as a binder in the art may be used.

Examples of the solvent may include N-methylpyrrolidone (NMP), acetone, and water. The solvent is not limited thereto, and any suitable solvent available in the art may be used.

The positive electrode active material may further include a second positive electrode active material which is available for use in a lithium battery.

The second positive electrode active material may be at least one selected from a lithium cobalt oxide, a lithium nickel cobalt manganese oxide, a lithium nickel cobalt aluminum oxide, a lithium iron phosphate oxide, and a lithium manganese oxide, but is not limited thereto, and any suitable positive electrode active material available in the art may be used.

For example, the second positive electrode active material may comprise at least one compound selected from compounds represented by the formulas $Li_aA_{1-b}R_bD_2$ (where, $0.90 \le a \le 1.8$, and $0 \le b \le 0.5$); $Li_aE_{1-b}R_bO_{2-c}D_c$ (where, $0.90 \le a \le 1.8$, $0 \le b \le 0.5$, and $0 \le c \le 0.05$); $LiE_{2-b}R_bO_{4-c}D_c$ (where, $0 \le b \le 0.5$ and $0 \le c \le 0.05$); $Li_aNi_{1-b-c}Co_bR_cD_\alpha$ (where, $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}X_\alpha$ (where, $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}X_2$ (where, $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (where, $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}X_\alpha$ (where, $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}X_2$ (where, $0.90 \le a \le 1.8$, $0 \le b \le 0.5$, $0 \le c \le 0.05$, and $0 \le \alpha 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dGeO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$ and $0.001 \le b \le 0.1$); $Li_aCoG_bO_2$ (where, $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (where, $0.90 \le a \le 1.8$ and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulas above, A is at least one selected from Ni, Co, and Mn; R is at least one selected from Al, Ni, Co, Mn, Cr, Fe, Mg, Sr, V, and a rare earth element; D is at least one selected from O, F, S, and P; E is at least one selected from Co, and Mn; X is at least one selected from F, S, and P; G is at least one selected from Al, Cr, Mn, Fe, Mg, La, Ce, Sr, and V; Q is at least one selected from Ti, Mo, and Mn; Z is at least one selected from Cr, V, Fe, Sc, and Y; and J is at least one selected from V, Cr, Mn, Co, Ni, and Cu.

A coating layer may be included on a surface of the second positive electrode active material, or a mixture of the second positive electrode active material and a positive electrode active material having a coating layer may be used. The coating layer may include at least one selected from an oxide or a hydroxide of a coating element, an oxyhydroxide of a coating element, an oxycarbonate of a coating element, and a hydroxycarbonate of a coating element. The compound forming the coating layer may be amorphous or crystalline. The coating element included in the coating layer may be at least one selected from Mg, Al, Co, K, Na, Ca, Si, Ti, V, Sn, Ge, Ga, B, As, and Zr. A process for forming the coating layer may be any suitable coating method (e.g., a spray coating method or an immersion method) as long as the coating process may be performed without negatively affecting a desirable physical property of the positive electrode active material. Details of the method can be determined by one of skill in the art without undue experimentation, and thus further description of the method is omitted.

For example, the compound for forming the coating layer may comprise at least one selected from $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \le x \le 0.5$, $0 \le y \le 0.5$), $LiFeO_2$, $V_2O_5$, TiS, and MoS.

Amounts of the positive electrode active material, the conducting agent, the binder, and the solvent used in a lithium battery can be determined by one of skill in the art without undue experimentation. At least one of the conducting agent, the binder, and the solvent may be omitted depending on use and configuration of a lithium battery.

The negative electrode may be prepared in the almost the same manner used in the preparation of the positive electrode, except using a negative electrode active material instead of the positive electrode active material.

The negative electrode active material may be include at least one selected from a carbon-based material, silicon, a silicon oxide, a silicon-based alloy, a silicon-carbon-based material complex, tin, a tin-based alloy, a tin-carbon complex, and a metal oxide.

The carbon-based material may be at least one selected from a crystalline carbon, and an amorphous carbon. Examples of the crystalline carbon may include graphite, such as amorphous, plate-shaped, flake-shaped, sphere, or fibrous natural graphite or artificial graphite. Examples of the amorphous carbon may include soft carbon (carbon heat treated at a relatively low temperature) or hard carbon, mesophase pitch carbide, heat-treated cokes, graphene, carbon black, fullerene soot, carbon nanotubes, and carbon fibers, but are not limited thereto, and any suitable material available as amorphous carbon in the art may be used.

The negative electrode active material may be selected from Si, $SiO_x$ (where, $0 < x < 2$, for example, from about 0.5 to about 1.5), Sn, $SnO_2$, and a silicon-containing metal. A metal that may form the silicon alloy may be at least one selected from Al, Sn, Ag, Fe, Bi, Mg, Zn, In, Ge, Pb, and Ti.

The negative electrode active material may include a metal and/or a metalloid capable of forming an alloy with lithium, or an alloy or an oxide thereof. For example, the metal and/or a metalloid capable of forming an alloy with lithium may be Si, Sn, Al, Ge, Pb, Bi, a SbSi-Π alloy (Π is selected from an alkali metal, an alkali earth metal, an element of Group 13, an element of Group 14, a transition metal, and a rare earth element, and is not Si), a Sn-Π alloy (n is selected from an alkali metal, an alkali earth metal, an element of Group 13, an element of Group 14, a transition metal, and a rare earth element, and is not Sn), and $MnOx$ ($0 < x \le 2$). Examples of Π may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po. For example, an oxide of the metal and/or metalloid capable of forming an alloy with lithium may be a lithium titanium oxide, a vanadium oxide, a lithium vanadium oxide, $SnO_2$, or $SiO_x$ ($0 < x < 2$).

For example, the negative electrode active material may include at least one element selected from elements of Group 13, elements of Group 14, and elements of Group 15 in the periodic table.

For example, the negative electrode active material may include at least one element selected from Si, Ge, and Sn.

Amounts of the negative electrode active material, the conducting agent, the binder, and the solvent in the negative electrode can be determined by one of skill in the art without undue experimentation.

The separator is disposed between the positive electrode and the negative electrode, wherein an insulating thin film having high ion permeability and mechanical strength may be used as the separator.

A pore diameter of the separator may be generally from about 0.01 μm to about 10 μm, and a thickness of the separator may be generally from about 5 μm to about 20 μm. The separator may be, for example, an olefin-based polymer, such as, polypropylene; or a sheet or a non-woven fabric formed of glass fibers or polyethylene. When a solid polymer electrolyte is used as the electrolyte, the solid polymer electrolyte may also serve as the separator.

Examples of the olefin-based polymer in the separator may include polyethylene, polypropylene, polyvinylidene, polyfluoride, and a multi-layer separator including at least two layers, and a mixed multi-layer separator, such as, a two-layer separator having a structure of polyethylene/polypropylene, a three-layer separator having a structure of polyethylene/polypropylene/polyethylene, or a three-layer separator having a structure of polypropylene/polyethylene/polypropylene.

The lithium salt-containing non-aqueous electrolyte includes a non-aqueous electrolyte and a lithium salt.

The non-aqueous electrolyte may be a non-aqueous electrolyte solution, an organic solid electrolyte, or an inorganic solid electrolyte.

The non-aqueous electrolyte solution may include an organic solvent. The organic solvent may be any suitable organic solvent available in the art. Examples of the organic solvent may include at least one selected from propylenecarbonate, ethylenecarbonate, fluoroethylencarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, fluoroethylenecarbonate, benzonitrile, acetonitrile, tetrahydrofuran, 2-methyltetrahyerofuran, γ-butylolactone, dioxolane, 4-methyldioxolane, N,N-dimethylformamide, N,N-dimethylacetamide, N,N-dimethylsulfoxide, dioxane, 1,2-dimethyoxyethane, sulfolane, dichloroethane, chlorobenzene, nitrobenzene, diethyleneglycol, and dimethylether.

Examples of the organic solid electrolyte may include polyethylene derivatives, polyethylene oxide derivatives, polypropylene oxide derivatives, phosphate ester polymers, poly agitation lysine, polyester sulfide, polyvinyl alcohols, polyvinylidene fluoride, and polymers containing ionic dissociation groups.

Examples of the inorganic solid electrolyte may include nitrides, halides and sulfates of lithium, such as $Li_3N$, $LiI$, $Li_5NI_2$, $Li_3N—LiI—LiOH$, $Li_2SiS_3$, $Li_4SiO_4$, $Li_4SiO_4—LiI—LiPH$, and $Li_3PO_4—Li_2S—SiS_2$.

The lithium salt is a material that is readily soluble in the non-aqueous electrolyte, and examples of the lithium salt include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are natural numbers), LiCl, and LiI. Also, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, or aluminum trichloride may be added to the non-aqueous electrolyte. If desired, in order to impart incombustibility, the non-aqueous electrolyte may further contain a halogen-containing solvent, such as carbon tetrachloride and ethylene trifluoride.

As shown in FIG. 1, a lithium battery 11 includes a positive electrode 13, a negative electrode 12, and a separator 14. The positive electrode 13, the negative electrode 12, and the separator 14 are wound or folded to be accommodated in a battery case 15. Subsequently, an organic electrolyte is injected into the battery case 15, and the battery case 15 is sealed with a cap assembly 16, thereby completing manufacture of the lithium battery 11. The battery case 15 may have a shape of a cylinder, a box, or a thin film. For example, the lithium battery 11 may be a thin film type battery. The lithium battery 11 may be a lithium ion battery.

The separator 14 is disposed between the positive electrode and the negative electrode to form a battery structure. The structures may be stacked in a by-cell structure and immersed in an organic electrolyte, and the resultant is accommodated in a pouch and sealed therein, thereby completing a lithium ion polymer battery.

Also, a plurality of the battery structures may be stacked and form a battery pack, and the battery pack may be used in any device requiring a high capacity and a high output. For example, the battery pack may be used in a laptop, a smartphone, or an electric vehicle.

The lithium battery has an excellent high rate capability and life characteristics and thus may be used in an electric vehicle (EV). For example, the lithium battery may be used in a hybrid vehicle, such as, a plug-in hybrid electric vehicle (PHEV).

A lithium secondary battery manufactured according to an embodiment may have a first cycle charging/discharging efficiency and capacity of relatively higher values due to an increase in conductivity. Also, a resistance decreases according to a speed of the charging/discharging, and thus a high speed charging/discharging of the battery may be possible. Particularly, during the charging/discharging, a side reaction occurring on a surface of the battery may be suppressed, and electrolyte decomposition on a surface of a positive electrode may be effectively prevented, and thus lifespan of the battery may increase.

Hereinafter, the present disclosure will be described in further detail with reference to the following examples. However, these examples are for illustrative purposes only and are not intended to limit the scope of the present disclosure.

EXAMPLES

Example 1

Preparation of Positive Electrode Active Material 2 grams (g) of a lithium complex oxide of the formula $LiNi_{0.6}Co_{0.1}Mn_{0.3}O_2$ (hereinafter, referred to as "NCM") was located in a reactor, while supplying nitrogen ($N_2$) gas for 1 hour at a flow rate of 300 standard cubic centimeters per minute (sccm), a temperature inside the reactor was increased to 400° C., and the temperature was maintained for one more hour. Next, methane ($CH_4$) gas was supplied into the reactor at a flow rate of 300 sccm. A pressure generated by the flow of the gas inside the reactor was 1 atmosphere (atm). Under the gas atmosphere, while continuously flowing the gas into the reactor, a temperature of the reactor was maintained at 400° C. for 6 hours to perform heat-treatment. Carbon was deposited on the NCM, forming a carbon coating layer. Then, the gas supply was ceased, and the reactor was cooled to room temperature while flowing a nitrogen gas into the reactor to obtain a positive electrode active material.

Examples 2 and 3

Preparation of Positive Electrode Active Materials

Positive electrode active materials were obtained in the same manner as used in Example 1, except that the temperature for heat-treatment was changed to 700° C. and 850° C., each respectively.

Example 4

Preparation of Positive Electrode Active Material

A positive electrode active materials were obtained in the same manner as used in Example 1, except that $LiCoO_2$ was used instead of the NCM.

Manufacturing Example 1

Manufacture of Coin Cell

The positive electrode active material prepared in Example 1 was mixed with super P, which is a conducting agent, polyvinylidene fluoride (PVDF), which is a binder, and N-methylpyrrolidone, which is a solvent to prepare slurry. A weight ratio of the positive electrode active material, the super P, and PVDF was 90:6:4 in the slurry. The slurry was coated on an aluminum substrate (having a thickness of 15 μm) by bar coating, dried at a low pressure at a temperature of 200° C., and then pressed and punched to prepare an electrode for a coin cell. Lithium metal was used as a counter electrode of the electrode. The electrode and the counter electrode are assembled using an electrolyte solution to manufacture a coin cell.

A capacity of the electrode was about 1.7 milliampere-hours per square centimeter ($mAh/cm^2$), and a thickness of the electrode was from about 50 millimeters (mm) to about 60 mm. The electrolyte solution was 1.3 molar (M) $LiPF_6$ in a combination of ethylene carbonate, diethyl carbonate, and ethyl methyl carbonate (EC/DEC/EMC) at a volume ratio of 3:5:2.

Manufacturing Examples 2 to 4

Manufacture of Coin Cells

Coin cells were manufactured in the same manner as in Manufacturing Example 1, except that the positive electrode active materials prepared in Examples 2 to 4 were used instead of the positive electrode active material prepared in Example 1, each respectively.

Comparative Manufacturing Example 1

Manufacture of Coin Cell

A coin cell was manufactured in the same manner as used in Manufacturing Example 1, except that NCM was used instead of the positive electrode active material prepared in Example 1.

Evaluation Example 1

X-Ray Diffraction Analysis

X-ray diffraction (XRD) analysis using CuKα was performed on a lithium complex oxide of the formula $LiNi_{0.6}Co_{0.1}Mn_{0.3}O_2$ before forming a carbon coating layer (hereinafter, referred to as "bare lithium complex oxide") and on the positive electrode active material prepared in Example 1.

Figure 2:
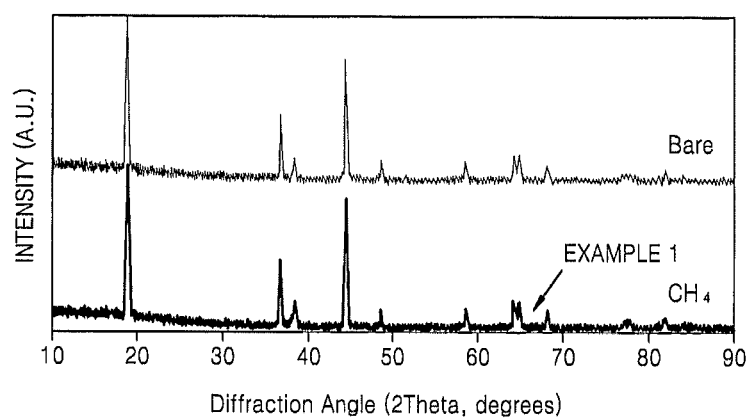
FIG. 2 is a graph of intensity (arbitrary units, a.u.) versus diffraction angle (degrees 2-theta) which shows the results of X-ray diffraction (XRD) analysis of a positive electrode active material prepared in Example 1 and a non-coated lithium complex oxide.

The XRD analysis was performed, and the results are shown in FIG. 2.

Referring to FIG. 2, the positive electrode active material prepared in Example 1 had substantially the same XRD peaks as the bare lithium complex oxide. The results confirmed that an inner structure of the positive electrode active material prepared in Example 1 was not deformed by the carbon coating layer.

Evaluation Example 2

FT-IR Analysis

An FT-IR analysis was performed on a uncoated lithium complex oxide of the formula $LiNi_{0.6}Co_{0.1}Mn_{0.3}O_2$ (hereinafter, referred to as "bare lithium complex oxide") and the positive electrode active material prepared in Example 1.

Figure 3:
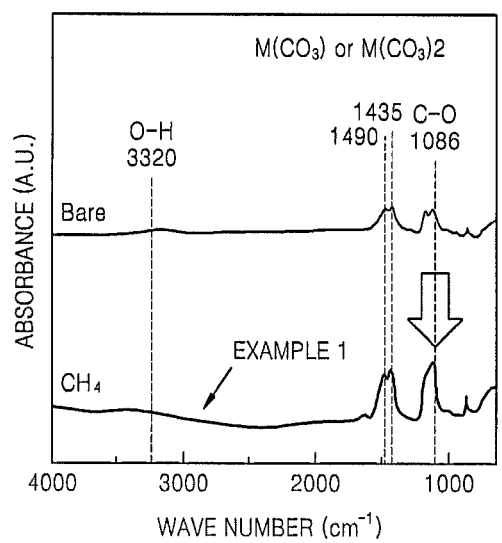
FIG. 3 is a graph of absorbance (arbitrary units, a.u.) versus wave number (inverse centimeters, cm$^{-1}$) which shows a Fourier transform infrared (FT-IR) spectrum of a non-coated lithium complex oxide and the positive electrode active material prepared in Example 1.

The FT-IR spectrum of the bare lithium complex oxide, and the FT-IR of the positive electrode active material prepared in Example 1, are shown in FIG. 3.

Referring to FIG. 3, a peak of metal carbonate, $M(CO_3)$ or $M(CO_3)_2$, of the positive electrode active material prepared in Example 1 was confirmed at about 1430 $cm^{-1}$ and about 1490 $cm^{-1}$.

Evaluation Example 3

XPS Analysis

XPS analysis was performed on a bare lithium complex oxide of the formula $LiNi_{0.6}Co_{0.1}Mn_{0.3}O_2$ before the heat-treatment and on the positive electrode active material prepared in Example 1 by using a Quantum 2000 instrument (Physical Electronics. Inc.) at an acceleration voltage of 0.5 kiloelectron volts (keV) to 15 keV and 300 watts (W), energy resolution of about 1.0 eV, a minimum analysis area of 10 micrometers, and a sputter rate of about 0.1 nanometer per minute (nm/min).

Figure 4A:
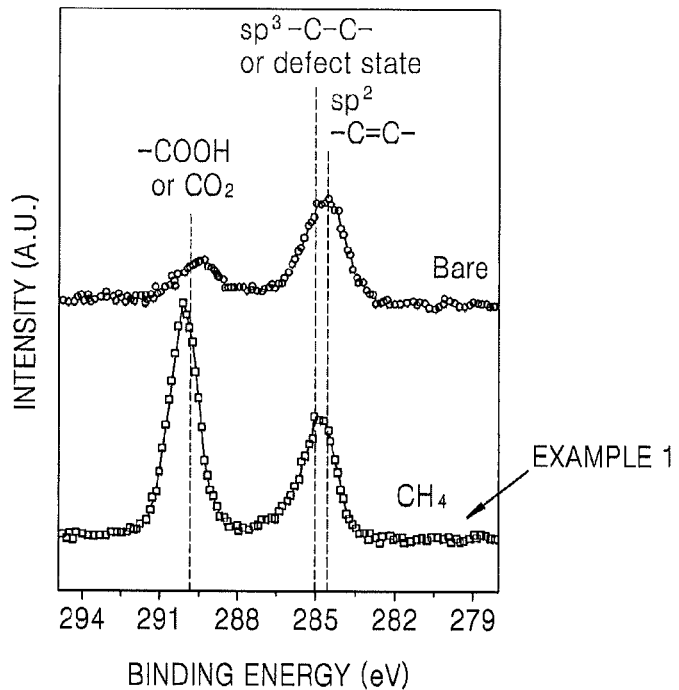
FIG. 4A is a graph of intensity (arbitrary units, a.u.) versus binding energy (electron volts, eV) which shows a C1s X-ray photoelectron spectroscopy (XPS) spectrum of a non-coated lithium complex oxide and the positive electrode active material prepared in Example 1.

The C1s XPS results of the bare lithium complex oxide and the positive electrode active material prepared in Example 1 are shown in FIG. 4A, and based on the results, the XPS spectrum composition analysis results of the bare lithium complex oxide and the positive electrode active material prepared in Example 1 are shown in Table 1.

As shown in FIG. 4A, in the C1s XPS spectrum obtained from an XPS analysis, it was confirmed that the positive electrode active material prepared in Example 1 has a peak intensity (a —COOH, carbonyl, or —$CO_2$ peak) at binding energy from about 288 eV to about 293 eV, which is increased compared to a peak intensity (of a C—C or C═C peak) at a binding energy from about 283 eV to about 287 eV. Referring to the results, it may be confirmed that the carbon coating layer formed on the lithium complex oxide is a carbonaceous material including a —COOH residue and a carbon-carbon covalent bond.

TABLE 1

|  | C1s (atomic percent) | O1s (atomic percent) | Mn2p (atomic percent) | Co2p (atomic percent) | Ni2p (atomic percent) |
|---|---|---|---|---|---|
| Bare lithium complex oxide | 16.63 | 64.56 | 7.60 | 0.97 | 10.25 |
| Example 1 | 22.82 | 66.43 | 3.81 | 0.78 | 6.14 |

Referring to the results of Table 1, it was confirmed that the positive electrode active material prepared in Example 1 may have an increased amount of carbon without a substantial change in a structure of the lithium complex oxide.

Figure 4B:
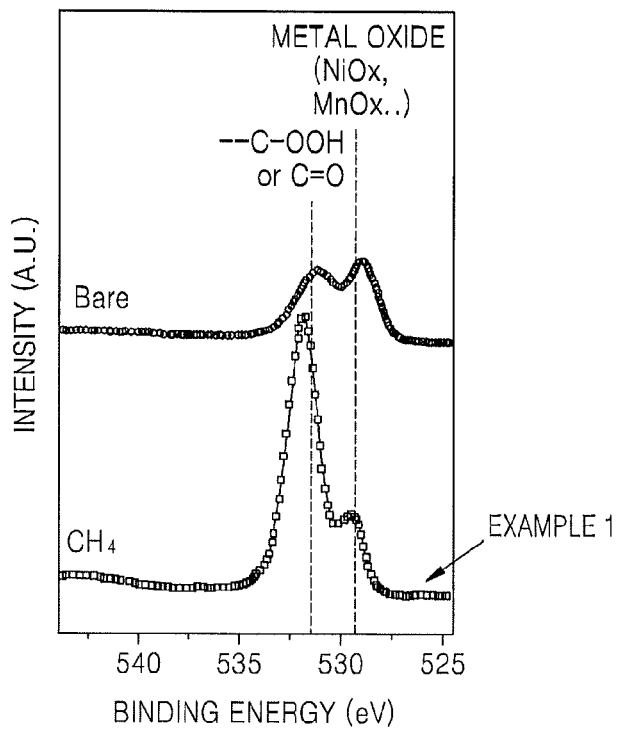
FIG. 4B is a graph of intensity (arbitrary units, a.u.) versus binding energy (electron volts, eV) which shows an O1s XPS spectrum with respect to a non-coated lithium complex oxide and the positive electrode active material prepared in Example 1.

Also, the O1s XPS results of the bare lithium complex oxide and the positive electrode active material prepared in Example 1 are shown in FIG. 4B.

Referring to FIG. 4B, in the O1s XPS spectrum obtained by an XPS analysis, it may be confirmed that a peak intensity (of a —COOH or —C═O peak) at binding energy from about 530.5 eV to about 535 eV is greater than a peak intensity of a peak at a binding energy from about 527.5 eV to about 530 eV.

Evaluation Example 4

Evaluation of Amount of Carbon Coating Layer by Thermogravimetry

Figure 5:
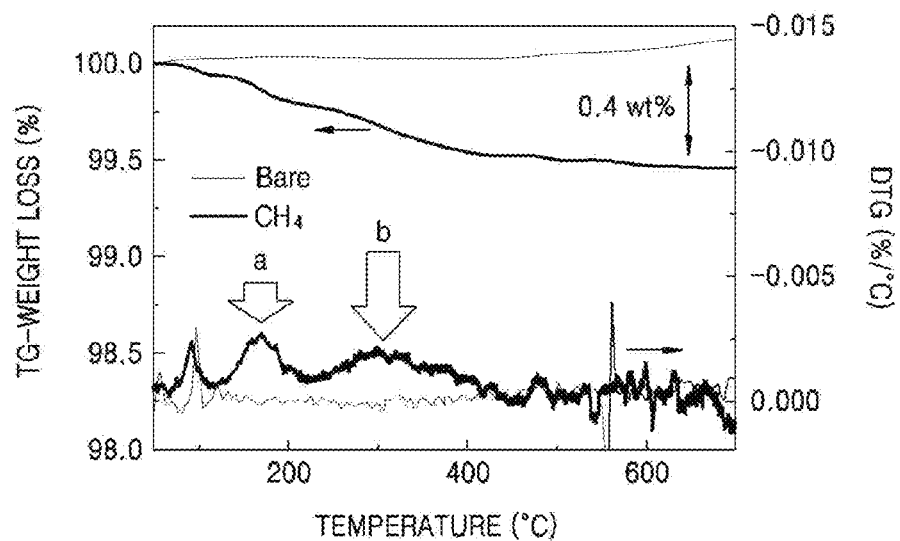
FIG. 5 is a graph of weight loss (percent, %) versus temperature (° C.) which shows the results of thermogravimetry analysis for a non-coated lithium complex oxide and the positive electrode active material prepared in Example 1.

Thermogravimetry analysis was performed on the bare lithium complex oxide and the positive electrode active material prepared in Example 1, and a TGA-DTGA curve thereof is shown in FIG. 5.

Referring to the TGA-DTGA results, it was confirmed that the positive electrode active material prepared in Example 1 included a carbon material in an amount of about 0.4 weight percent (wt %), based on a total weight of the positive electrode active material. Also, a first peak (a in FIG. 5) derived from amorphous carbon at a temperature from about 150° C. to about 220° C. and a second peak (b in FIG. 5), which is related to carbonyl manganese, Mn(CO)x, that is obtained as a product of a side reaction between the active material and the electrolyte at a temperature from about 230° C. to about 410° C., was observed.

Evaluation Example 5

Evaluation of Homogeneity by Energy Dispersive X-Ray Spectroscopy (EDS) Carbon Mapping EDS analysis was performed on the positive electrode active materials prepared in Examples 1 and 2.

Referring to the EDS carbon-mapping results, it may be confirmed that a carbon coating layer having homogeneous carbon atom distribution was formed on the positive electrode active materials prepared in Examples 1 and 2.

Evaluation Example 6

Conductivity

Conductivities of the bare lithium complex oxide and the positive electrode active material prepared in Example 1 were measured and shown in Table 2.

TABLE 2

| Sample | Conductivity (S/cm) |
|---|---|
| Bare lithium complex oxide | $1.385 \times 10^{-8}$ |
| Example 1 | $3.211 \times 10^{-2}$ |

S/cm is Siemens per centimeter

Referring to the results shown in Table 2, it was confirmed that the positive electrode active material prepared in Example 1 has a conductivity that is significantly increased compared to that of the bare lithium complex oxide.

Evaluation Example 7

SEM Analysis

An ultra-resolution field emission scanning electron microscope (UHR-FE-SEM, Hitachi S-5500, resolution 0.4 nm) at 30 kV was used to perform an SEM analysis on the positive electrode active material prepared in Example 1 and the bare lithium complex oxide.

Figure 6:
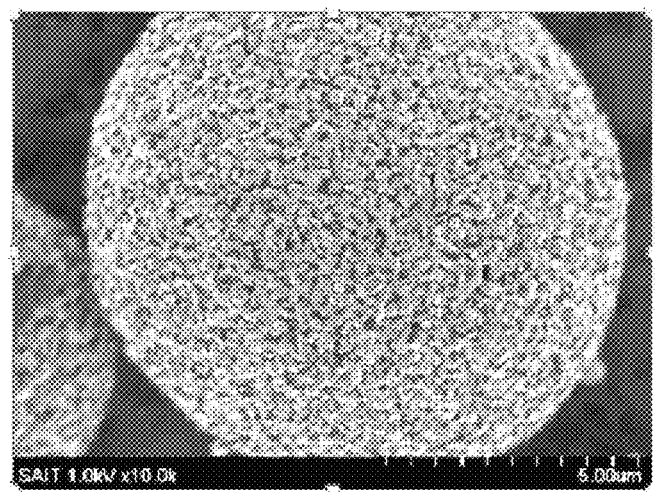
FIGS. 6 to 8 are scanning electron microscope (SEM) images of the positive electrode active material prepared in Example 1.
Figure 7:
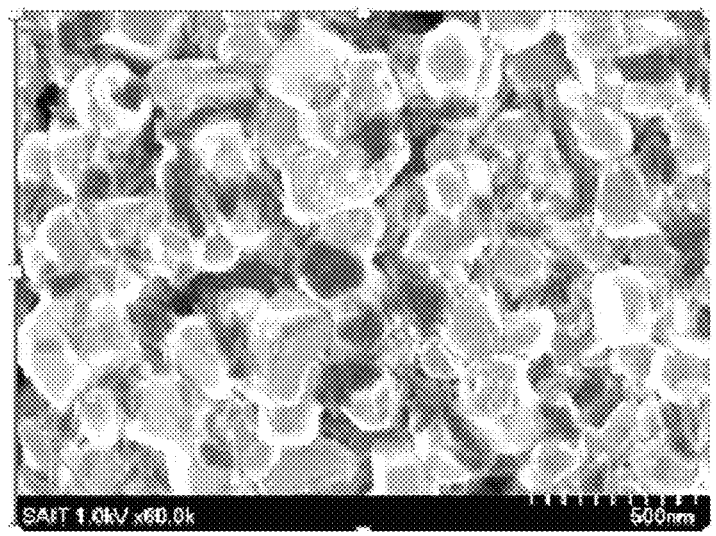
Figure 8:
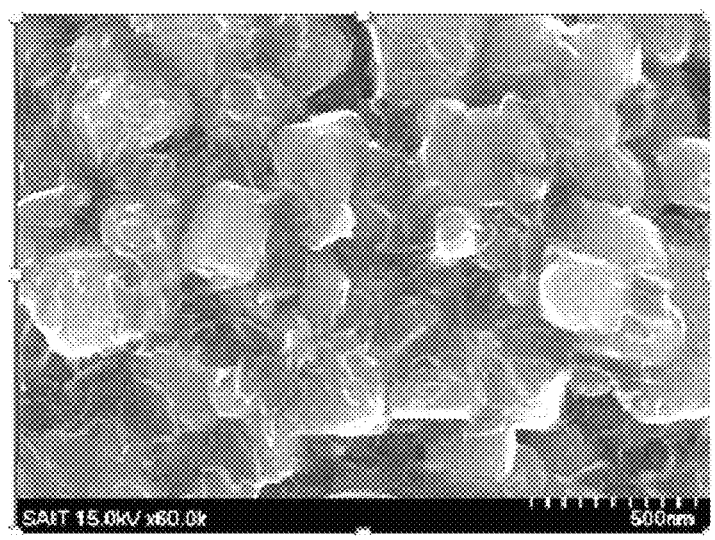
Figure 9:
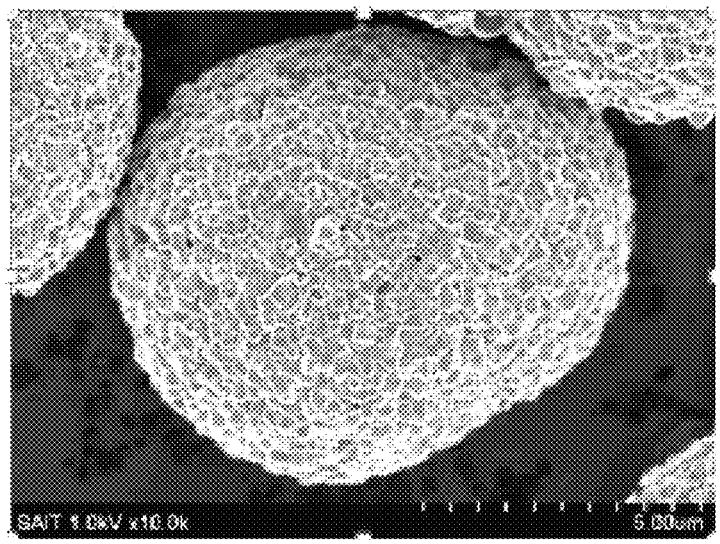
FIGS. 9 and 10 are images showing the results of SEM analysis on a non-coated lithium complex oxide.
Figure 10:
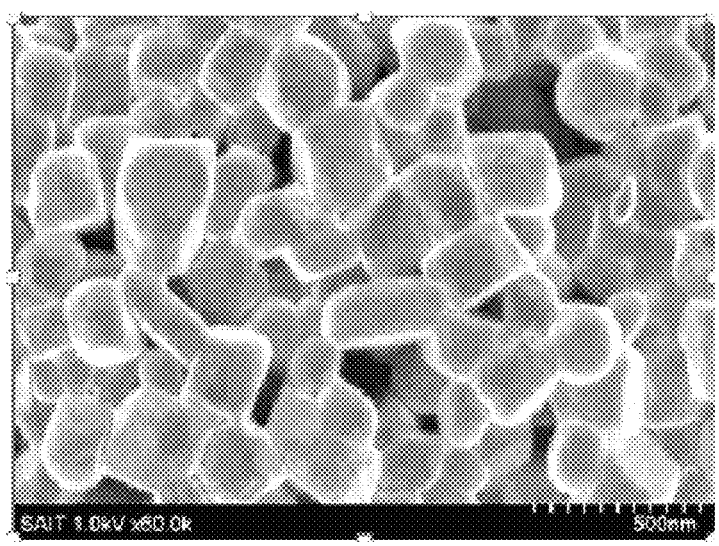

The SEM analysis results of the positive electrode active material prepared in Example 1 are shown in FIGS. 6 to 8, and the SEM analysis results of the bare lithium complex oxide was shown in FIGS. 9 and 10.

In FIGS. 6 to 8, it may be confirmed that the positive electrode active material prepared in Example 1 has a carbon coating layer, in which a space between particles is filled with a carbon coating material, formed thereon. In FIGS. 9 and 10, it may be confirmed that the bare lithium complex oxide has a clean surface and a porous structure.

Also, a cross-sectional view of the bare lithium complex oxide and the positive electrode active material prepared in Example 1 were observed using an SEM, and the results were shown in FIGS. 14A to 14C and FIGS. 15A and 15B.

Figure 14A:
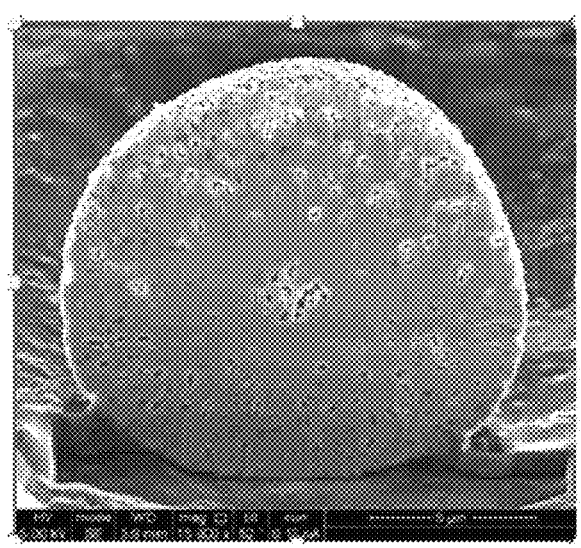
FIGS. 14A to 14C are SEM images showing a cross-sectional view of a non-coated complex oxide.
Figure 14B:
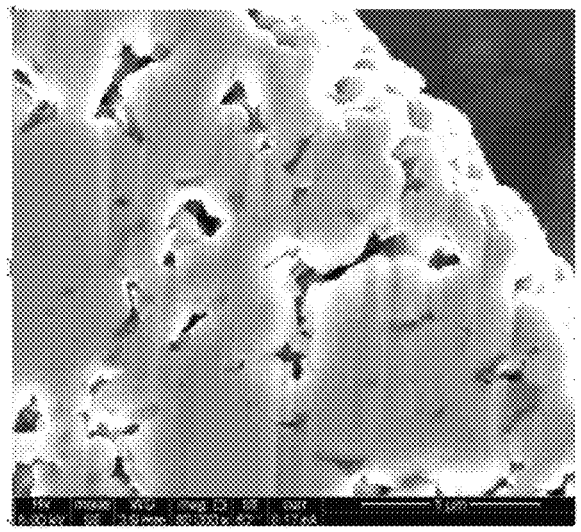
Figure 14C:
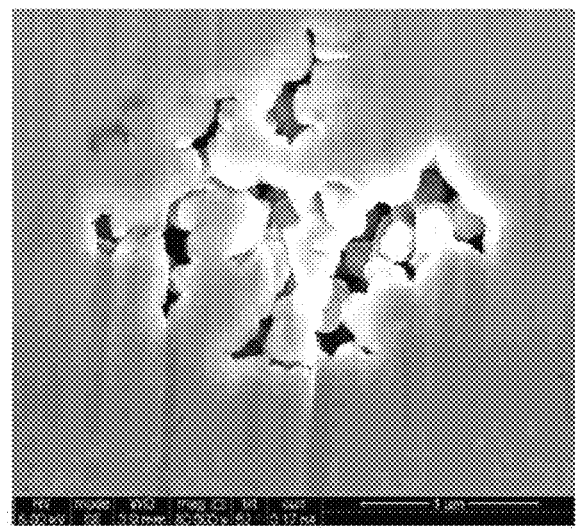

FIGS. 14A to 14C are SEM images of a cross-sectional view of the bare lithium complex oxide.

Figure 15A:
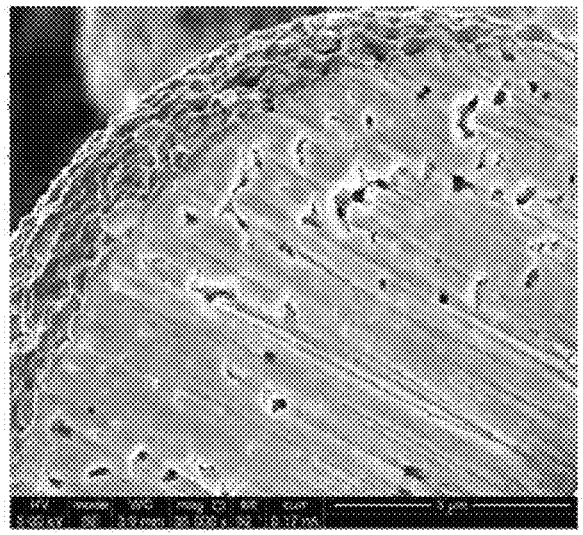
FIGS. 15A and 15B are SEM images showing a cross-sectional view of the positive electrode active material prepared in Example 1.
Figure 15B:
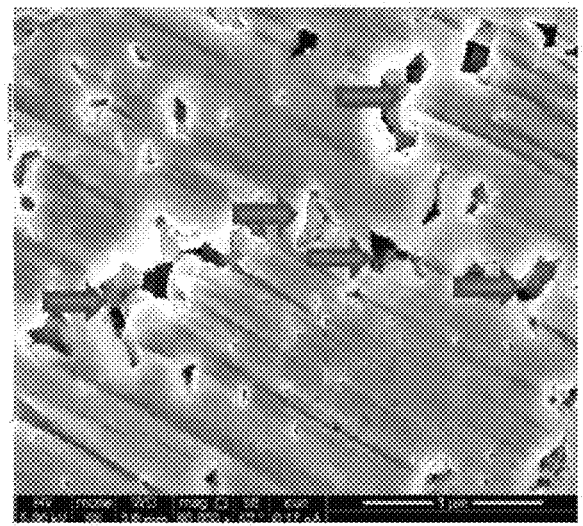

FIGS. 15A and 15B are SEM images of a cross-sectional view of the positive electrode active material prepared in Example 1.

Referring to FIGS. 14A to 14C and FIGS. 15A and 15B, it may be confirmed that an inside of the positive electrode active material prepared in Example 1 is coated with carbon, unlike the bare lithium complex oxide.

Evaluation Example 8

Porosity Analysis

A specific surface area, an average pore diameter, and a pore volume of the positive electrode active material prepared in Example 1 and the bare lithium complex oxide were measured, and the results are shown in Table 3.

TABLE 3

|  | Specific surface area (m²/g) | Average pore diameter (nm) | Pore volume (cm³/g) |
|---|---|---|---|
| Example 1 | 15 | 6.0 | 224 |
| Bare lithium complex oxide | 7.8 | 9.6 | 188 |

As it may be confirmed by referring to Table 3, that an average pore diameter of the positive electrode active material prepared in Example 1 decreased compared to that of the bare lithium complex oxide, and a specific surface area and a pore volume of the positive electrode active material prepared in Example 1 increased compared to that of the bare lithium complex oxide. In this regard, rate performance improves as a surface of the active material contacting the electrolyte increases.

Evaluation Example 9

Evaluation of Battery Characteristics (Durability)

The battery prepared in Manufacture Example 1 was charged and discharged at a low rate of 0.05 C/0.05 C to confirm its capacity and charged and discharged at a rate of 0.5 C/0.5 C to confirm its rate characteristics. In order to compare performance of the coin cell prepared in Manufacture Example 1, the same charging and discharging evaluation was performed on the coin cell prepared in Comparative Manufacture Example 1 under the same conditions used for evaluating the coin cell prepared in Manufacture Example 1.

Figure 11:
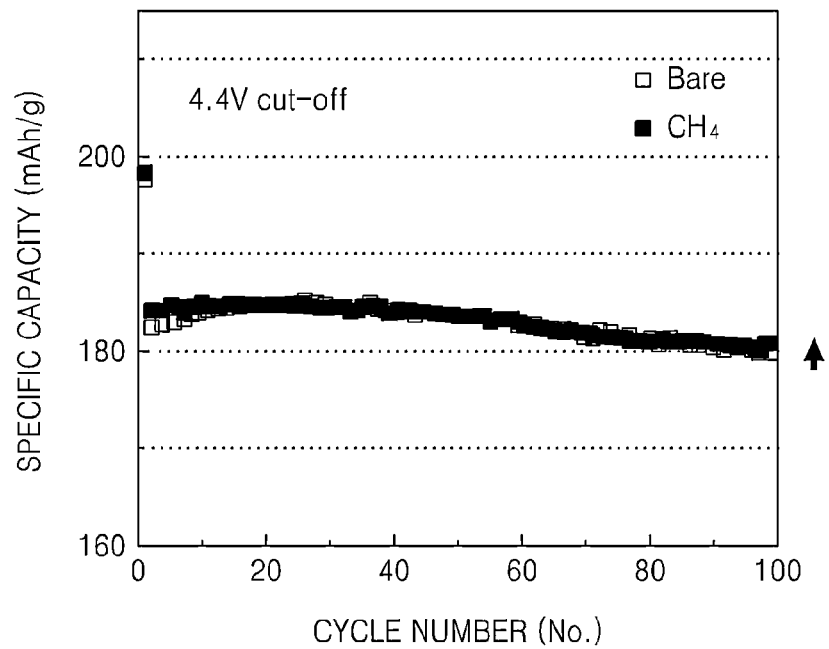
FIGS. 11 to 13 are graphs of specific capacity (milliampere-hours per gram) versus cycle number illustrating a change in a specific capacity for a coin cell prepared in Manufacturing Example 1 ($CH_4$) and a coin cell prepared in Comparative Manufacturing Example 1 (Bare)
Figure 12:
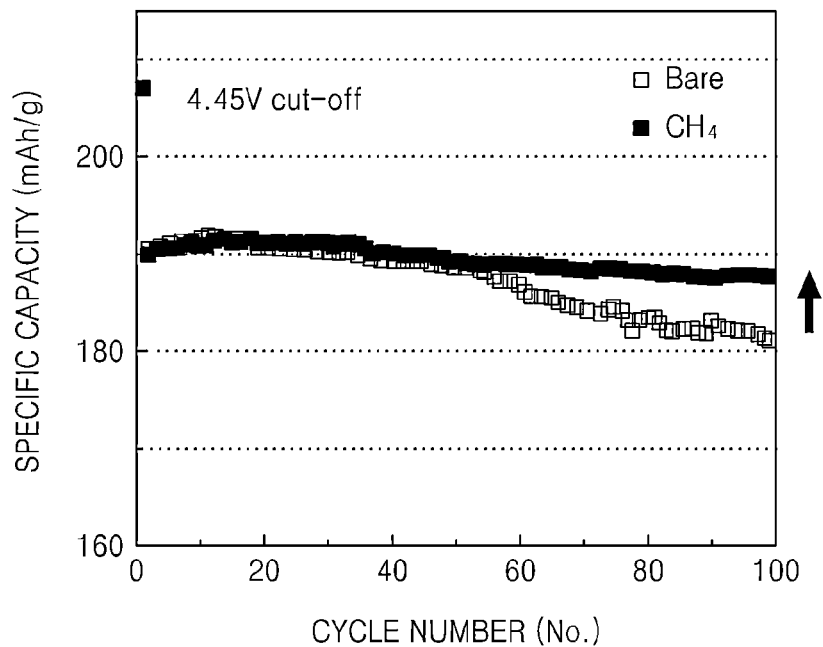
Figure 13:
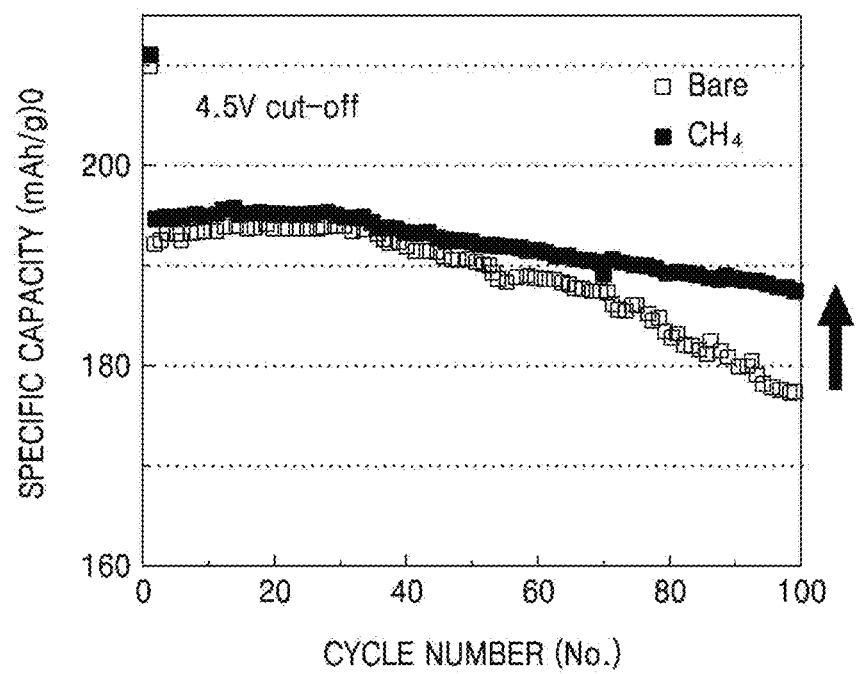

The charging and discharging results are shown in Table 4 and FIGS. 11 to 13. In FIGS. 11 to 13, $CH_4$ refers to the coin cell prepared in Manufacturing Example 1, and Bare refers to the coin cell prepared in Comparative Manufacturing Example 1.

In Table 3, an initial efficiency, a rate capacity, and life characteristics are evaluated according to Equations 1 to 3.

Initial efficiency={($1^{st}$ cycle discharge capacity)/($1^{st}$ cycle charge capacity)}×100      Equation 1

Rate characteristics={(0.5 C discharge capacity)/(0.05 C discharge capacity)}×100      Equation 2

Lifespan={(Discharge capacity after $100^{th}$ cycle)/($1^{st}$ cycle discharge capacity)}×100      Equation 3

TABLE 4

|  |  | Capacity (mAh/g) | Initial efficiency (%) | Rate characteristics (%) | Coulombic efficiency (%) | Lifespan (% @ 100th) |  |
|---|---|---|---|---|---|---|---|
| Cut-off 4.4 V | Bare | 198.5 | 92.49 | 92.62 | 99.75 | 98.16 |  |
|  | CH4 | 198.3 | 94.41 | 92.84 | 99.2 | 98.33 | 0.3↑ |
| Cut-off 4.45 V | Bare | 206.7 | 92.90 | 92.06 | 99.78 | 95.07 |  |
|  | CH4 | 207.1 | 93.90 | 92.23 | 99.90 | 98.38 | 3.5↑ |
| Cut-off 4.6 V | Bare | 209.3 | 91.95 | 91.64 | 99.63 | 91.83 |  |
|  | CH4 | 210.5 | 93.27 | 92.34 | 99.85 | 95.97 | 3.5↑ |

Referring to Table 4 and FIGS. 11 to 13, it may be confirmed that life characteristics of the coin cell prepared in Manufacturing Example 1 is improved compared to the case of Comparative Manufacturing Example 1. In addition, a coulombic effect, which may be an indication of a side reaction suppressing effect, of the coin cell prepared in Manufacturing Example 1 including the positive electrode active material prepared in Example 1 is improved compared to the case of the coin cell prepared in Comparative Manufacturing Example 1 including the bare lithium complex oxide under a high voltage (from about 4.45 V to about 4.5 V) condition. Also, it may be confirmed that a rate characteristics and initial efficiency characteristics of the coin cell prepared in Manufacture Example 1 improved due to an increased conductivity.

(2) Rate Characteristics

The coin cell prepared in Manufacture Example 1 was charged and discharged at a low rate (0.05 C, 0.1 C, 0.2 C, 0.5 C, 1 C, 2 C, or 5 C) to confirm its capacity. In order to compare a capacity of the coin cell prepared in Manufacturing Example 1, the same charging and discharging were performed on the coin cell prepared in Comparative Manufacturing Example 1 under the same conditions used for evaluating the coin cell prepared in Manufacturing Example 1.

The charging and discharging results are shown in Table 5, and charging and discharging efficiency was evaluated according to Equation 4.

Charging and discharging efficiency={(Discharging capacity)/(charging capacity)}×100      Equation 4

TABLE 5

|  | Bare | | $CH_4$ | | Δ | |
|---|---|---|---|---|---|---|
| Discharge rate(C) | Capacity (mAh/g) | Chg/Dchg efficiency (%) | Capacity (mAh/g) | Chg/Dchg efficiency (%) | Capacity (mAh/g) | Chg/Dchg efficiency (%) |
| 0.05 | 198.3 | 92.43 | 198.9 | 94.54 | 0.6 | 2.28 |
| 0.1 | 194.5 | 97.62 | 197.9 | 97.90 | 3.4 | 0.29 |
| 0.2 | 189.8 | 97.19 | 194.4 | 97.88 | 4.6 | 0.71 |
| 0.5 | 182.0 | 95.57 | 187.1 | 96.35 | 5.1 | 0.82 |
| 1 | 175.1 | 95.99 | 180.4 | 96.94 | 5.3 | 0.99 |
| 2 | 166.7 | 95.02 | 172.6 | 96.32 | 5.9 | 1.37 |
| 5 | 149.6 | 89.39 | 155.1 | 90.51 | 5.5 | 1.25 |

Chg/Dchg refers to charging/discharging, Δ is the difference between the bare and carbon coated ($CH_4$) cells.

Referring to Table 5, it may be confirmed that initial efficiency, rate characteristics, coulombic efficiency, and life characteristics of the coin cell prepared in Manufacturing Example 1 were improved compared to those of the coin cell prepared in Comparative Manufacturing Example 1 including the bare lithium complex oxide.

As described above, according to the one or more of the above embodiments, a positive electrode active material may suppress a reaction between the positive electrode active material and an electrolyte in a high-voltage environment, and thus conductivity of the positive electrode active material improves. Therefore, a lithium battery including the positive electrode active material may have improved lifespan, rate capability, and durability.

It should be understood that the exemplary embodiments described therein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive electrode active material comprising:
a lithium complex oxide represented by Formula 3; and
a carbon coating layer disposed on the lithium complex oxide, wherein the carbon coating layer comprises amorphous carbon and a metal-carbonyl compound,
wherein, in a C1s X-ray photoelectron spectroscopy (XPS) spectrum of the positive electrode active material, a peak intensity of a first peak at a binding energy from about 288 electron volts to about 293 electron volts is greater than a peak intensity of a second peak at a binding energy from about 283 electron volts to about 287 electron volts, and
in an O1s X-ray photoelectron spectrum of the positive electrode active material, a peak intensity of a third peak at a binding energy from about 530.5 electron volts to about 535 electron volts is greater than a peak intensity of a fourth peak at a binding energy from about 527.5 electron volts to about 530 electron volts, $$Li_aNi_bCo_{1-b-c}Mn_cM''_dO_2 \quad \text{Formula 3}$$

wherein, in Formula 3,
M'' is an element selected from Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba,
$0.4 \le a \le 1.0$, $0 \le b \le 1$, $0 \le c \le 1$, $0 \le d \le 1$, $0 \le e \le 1$, and b+c+d=1,
at least one of M and M' is selected from Ni, Co, Mn, Mo, Cu, and Fe, and
at least one of M and M' is selected from Ni, Co, Mn, Mo, Cu, and Fe,
wherein a first derivative thermogravimetry peak is at a temperature from about 120° C. to about 220° C., and a second derivative thermogravimetry peak is at a temperature from about 230° C. to about 410° C., when the positive electrode active material is analyzed by derivative thermogravimetry, and
wherein an intensity ratio of the first derivative thermogravimetry peak to the second derivative thermogravimetry peak is in a range of 1:9 to 9:1.

2. The positive electrode active material of claim 1, wherein
an intensity ratio of the first peak at the binding energy from about 288 electron volts to about 293 electron volts and the second peak at the binding energy from about 283 electron volts to about 287 electron volts is in a range of 1:1 to 3:1, and
an intensity ratio of the third peak at the binding energy from about 530.5 electron volts to about 535 electron volts and the fourth peak at the binding energy from about 527.5 electron volts to about 530 electron volts is in a range of 1:1 to 3:1.

3. The positive electrode active material of claim 1, wherein
an integrated intensity ratio of the first peak at the binding energy from about 288 electron volts to about 293 electron volts to the second peak at the binding energy from about 283 electron volts to about 287 electron volts is in a range of 1:1 to 3:1, and
an intensity ratio of the third peak at the binding energy from about 530.5 electron volts to about 535 electron volts to the fourth peak at the binding energy from about 527.5 electron volts to about 530 electron volts is in a range of 1:1 to 3:1.

4. The positive electrode active material of claim 1, wherein an $O_{1S}/C_{1S}$ atomic ratio obtained X-ray photoelectron analysis is in a range of about 2.5:1 to about 3.2:1.

5. The positive electrode active material of claim 1, wherein the lithium complex oxide is a compound represented by Formula 4:

$$Li_aNi_bCo_{1-b-c}Mn_cO_2 \quad \text{Formula 4}$$

wherein, in Formula 4, $0.4 \le a \le 1.0$, $0 \le b \le 1$, and $0 \le c \le 1$.

6. The positive electrode active material of claim 1, wherein the lithium complex oxide is a lithium transition metal oxide, which is selected from $LiCoO_2$, $LiCo_{0.1}Ni_{0.6}Mn_{0.3}O_2$, and $LiCo_{0.33}Ni_{0.33}Mn_{0.33}O_2$.

7. The positive electrode active material of claim 1, wherein an inner portion of the lithium complex oxide is coated with carbon.

8. The positive electrode active material of claim 1, wherein an amount of carbon in the carbon coating layer is from about 0.001 part to about 15 parts by weight, based on 100 parts by weight of the lithium complex oxide represented by Formula 1.

9. The positive electrode active material of claim 1, wherein the carbon coating layer is a continuous coating layer.

10. The positive electrode active material of claim 1, wherein a thickness of the carbon coating layer is from about 0.01 nanometer to about 100 nanometers.

11. The positive electrode active material of claim 1, further comprising a metal compound layer comprising a metal compound, wherein the metal compound layer is disposed on a surface of the carbon coating layer which is opposite the lithium complex oxide, or the metal compound layer is disposed between the lithium complex oxide represented by Formula 1 and the carbon coating layer.

12. The positive electrode active material of claim 11, wherein the metal compound is at least one selected from a magnesium oxide, a manganese oxide, an aluminum oxide, a titanium oxide, a zirconium oxide, a tantalum oxide, a tin oxide, a hafnium oxide, and an aluminum fluoride.

13. A lithium battery comprising a positive electrode comprising the positive electrode active material of claim 1.

14. A method of preparing a positive electrode active material, the method comprising:
heat-treating a lithium complex oxide represented by Formula 1 in an atmosphere comprising a compound represented by Formula 2 to prepare the positive electrode active material of claim 1, $$Li_aM_bM'_cM''_dO_e \quad \text{Formula 1}$$

wherein, in Formula 1,
$0 \le a \le 1.0$, $0 \le b \le 2$, $0 \le c \le 2$, and $0 \le d \le 2$;
b, c, and d are identical or different and are not simultaneously 0,
e is a value that makes the lithium complex oxide electrically neutral and is in a range of 1 to 4;
M and M' are different and are each independently selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, B, and Ba;
M'' is an element different from M and M' and is selected from Ni, Co, Mn, Mo, Cu, Fe, Cr, Ge, Al, Mg, Zr, W, Ru, Rh, Pd, Os, Ir, Pt, Sc, Ti, V, Ga, Nb, Ag, Hf, Au, Cs, Ba, Si, B, F, S, and P; and
at least one of M and M' is selected from Ni, Co, Mn, Mo, Cu, and Fe;

$$C_nH_{(2n)} \quad \text{Formula 2}$$

wherein, in Formula 2, n is in a range of 1 to 6.

15. The method of claim 14, wherein the compound represented by Formula 2 comprises at least one compound selected from methane, and butane.

16. The method of claim 14, wherein the atmosphere comprising the compound represented by Formula 2 further comprises at least one inert gas selected from nitrogen, helium, and argon.

17. The method of claim 14, wherein the heat-treating is performed at a temperature of 1000° C. or less.

* * * * *